United States Patent
Chen et al.

(10) Patent No.: US 9,882,908 B2
(45) Date of Patent: Jan. 30, 2018

(54) TRANSPARENT ASYNCHRONOUS NETWORK FLOW INFORMATION EXCHANGE

(71) Applicant: International Business Machines Corporation, Armonk, NY (US)

(72) Inventors: KuoChun Chen, New Taipei (TW); Jia-Sian Jhang, New Taipei (TW); Cheng-Ta Lee, Taipei (TW); Chun-Shuo Lin, Tainan (TW)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 14/825,064

(22) Filed: Aug. 12, 2015

(65) Prior Publication Data

US 2017/0048256 A1    Feb. 16, 2017

(51) Int. Cl.
*H04L 29/06* (2006.01)

(52) U.S. Cl.
CPC ............ *H04L 63/10* (2013.01); *H04L 63/20* (2013.01)

(58) Field of Classification Search
CPC ................................ H04L 63/10; H04L 63/20
USPC ............................................................. 726/3
See application file for complete search history.

(56) References Cited

U.S. PATENT DOCUMENTS

| | | |
|---|---|---|
| 8,839,408 B1 | 9/2014 | McKinnon et al. |
| 8,843,998 B2 | 9/2014 | Fu et al. |
| 2012/0281708 A1 | 11/2012 | Chauhan et al. |
| 2014/0379856 A1 | 12/2014 | Agarwal et al. |
| 2015/0012751 A1 | 1/2015 | Forster et al. |

OTHER PUBLICATIONS

Andersen et al., "Accountable Internet Protocol (AIP)," SIGCOMM'08, Aug. 17-22, 2008, 12 Pages, ACM, Seattle, Washington.
Haeberlen et al., "Pretty Good Packet Authentication," Proceedings of the Fourth Conference on Hot Topics in System Dependability (HotDep'08), 2008, p. 1-5.
Karlin et al., "Pretty Good BGP: Protecting BGP by Cautiously Selecting Routes," National Science Foundation, 2005, p. 1-14, University of New Mexico, Princeton University.
Kent et al., "Secure Border Gateway Protocol (S-BGP)—Real World Performance and Deployment Issues," Proceedings of the Network and Distributed System Security Symposium (NDSS 2000), Feb. 2000, p. 1-14, © Internet Society, San Diego, California.

(Continued)

*Primary Examiner* — Hadi Armouche
*Assistant Examiner* — Angela Holmes
(74) *Attorney, Agent, or Firm* — Patricia B. Feighan

(57) ABSTRACT

A method for providing a transparent asynchronous network flow exchange is provided. The method may include receiving a query request from a requester, whereby the received query request is associated with a network packet. The method may also include determining if the network packet contains a plurality of defined signatures. The method may further include in response to determining that the network packet contains a plurality of defined signatures, authenticating a plurality of information associated with the network packet. The method may additionally include determining a plurality of flow related security information associated with the network packet based on the authentication of the plurality of information. The method may include sending the determined plurality of flow related security information to the requester.

16 Claims, 6 Drawing Sheets

(56) References Cited

OTHER PUBLICATIONS

Mell et al., "The NIST Definition of Cloud Computing," National Institute of Standards and Technology, Sep. 2011, p. 1-3, Special Publication 800-145.
Savage et al., "Practical Network Support for IP Traceback," SIGCOMM'00, 2000, p. 1-12, ACM, Stockholm, Sweden.

TRANSPARENT ASYNCHRONOUS NETWORK FLOW INFORMATION EXCHANGE

BACKGROUND

The present invention relates generally to the field of computers, and more particularly to network flow information exchange.

In the cloud era, the boundary between users and services may be vague. The services running by an enterprise could be in the public cloud, hybrid cloud or the on-premise private cloud. The users using the services may also be spread across different type of clouds. Enterprise is especially sensitive to the network traffic in a hybrid cloud deployment model. For example, IBM® Bluemix™ could be a natural extension of the on-premise datacenter in the enterprise and vice versa. The enterprise may still prefer running important services in the on-premise data center for security reasons, however they may want to run the applications in the public/hybrid cloud for scalability and availability.

SUMMARY

According to one embodiment, a method for providing a transparent asynchronous network flow exchange is provided. The method may include receiving a query request from a requester, whereby the received query request is associated with a network packet. The method may also include determining if the network packet contains a plurality of defined signatures. The method may further include in response to determining that the network packet contains a plurality of defined signatures, authenticating a plurality of information associated with the network packet. The method may additionally include determining a plurality of flow related security information associated with the network packet based on the authentication of the plurality of information. The method may include sending the determined plurality of flow related security information to the requester.

According to another embodiment, a computer system for providing a transparent asynchronous network flow exchange is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a query request from a requester, whereby the received query request is associated with a network packet. The method may also include determining if the network packet contains a plurality of defined signatures. The method may further include in response to determining that the network packet contains a plurality of defined signatures, authenticating a plurality of information associated with the network packet. The method may additionally include determining a plurality of flow related security information associated with the network packet based on the authentication of the plurality of information. The method may include sending the determined plurality of flow related security information to the requester.

According to yet another embodiment, a computer program product for providing a transparent asynchronous network flow exchange is provided. The computer program product may include one or more computer-readable storage devices and program instructions stored on at least one of the one or more tangible storage devices, the program instructions executable by a processor. The computer program product may include program instructions to receive a query request from a requester, whereby the received query request is associated with a network packet. The computer program product may also include program instructions to determine if the network packet contains a plurality of defined signatures. The computer program product may further include in response to determining that the network packet contains a plurality of defined signatures, program instructions to authenticate a plurality of information associated with the network packet. The computer program product may additionally include program instructions to determine a plurality of flow related security information associated with the network packet based on the authentication of the plurality of information. The computer program product may include program instructions to send the determined plurality of flow related security information to the requester.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
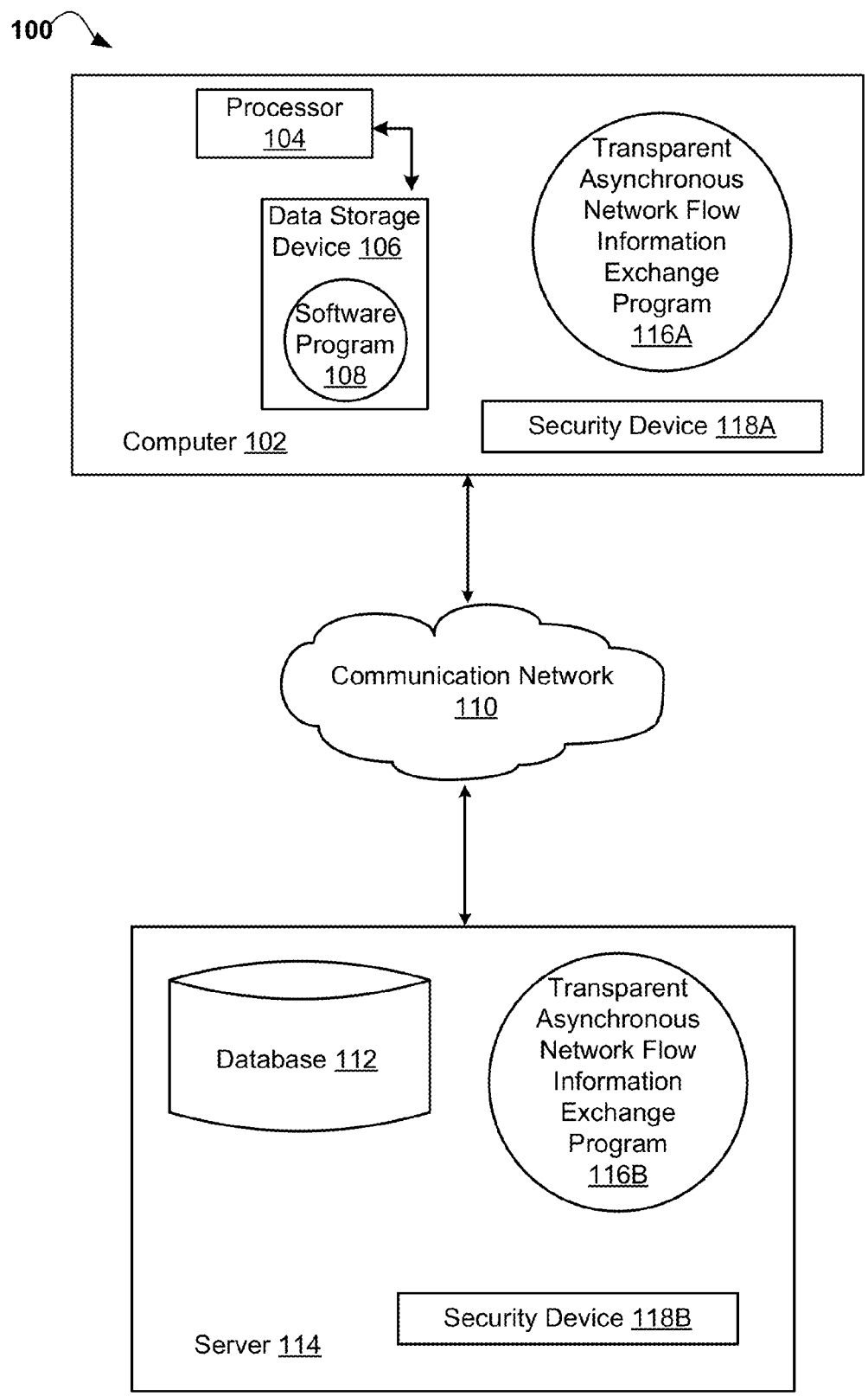
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to network flow information exchange. The following described exemplary embodiments provide a system, method and program product to, among other things, provide a transparent asynchronous network flow information exchange. Therefore, the present embodiment has the capacity to improve the technical field of network flow information exchange by allowing the security devices in the source to share required information with the device on the destination side. As such, the security devices in the destination can perform actions with greater granularity. Additionally, the request receiver, such as applications, security devices, or infrastructure devices can also perform advanced actions with the response from the security device. More specifically, the present embodiment may provide an asynchronous, proactive mechanism to query the additional flow information from the network flow receiver (i.e., any devices that can receive packets, such as IPS, Gateway, Router, or PC, Server) to the security device and an interface (i.e., program/software or protocol) on the security device to handle the query sent from the network flow receiver to acquire additional flow information.

As previously described, in the cloud era, the boundary between users and services may be vague. The services running by an enterprise could be in the public cloud, hybrid cloud or the on-premise private cloud and the users using the services may also be spread across different type of clouds. The enterprise may still prefer running important services in the on-premise data center for security reasons, however they may want to run the applications in the public/hybrid cloud for scalability and availability.

As such, the traffic between the cloud and the on-premise data center may expose new security risks in the hybrid cloud deployment. Therefore, the security administration in the enterprise may need to make sure that the traffic between cloud and on-premise datacenter is secured and the traffic originator needs to be valid. Even with the security devices deployed on each side, currently there is no way to validate the information bound to the traffic sent out from the security devices. For example, when IBM® Bluemix™ receives an HTTPs request sent from the enterprise, it has no idea if the traffic has been inspected by the IPS located in the on-premise data center in enterprise. Also, it has no knowledge of the user identity initiating the request in the enterprise or if the host has connected to a bot-commander before; if the host has tried to upload sensitive information to an open forum; or if the host already has a problem, such as the patch level is not up-to-date.

Currently, one solution includes adding a new HTTP header for attaching security information. However, this may waste bandwidth and is not scalable. As such, there currently is no practical mechanism of exchanging additional information bound to the traffic between public cloud and an on-premise data center and there is no efficient way to validate security information between security enforcement points in the cloud and in the on-premise data center. Moreover, it is difficult to attach additional information to an existed network flow. (e.g. the IP Option field in the network packet might be stripped by the network gateway). As such, it may be advantageous, among other things, to provide a transparent asynchronous network flow information exchange.

According to at least one implementation, the present embodiment may allow the security devices in the source to share required information to the device in the destination side, so that the security devices in the destination can perform actions with greater granularity. For example, the information may be a user ID, a machine ID, an application type, or the scan information of the connection. Then, with these attributes, the security device in the destination side can apply advanced policies according to the given information, such as allowing traffic with specific application ID to a corresponding (virtual) machines, or denying connections with a user that does not have correct permissions to specific machines.

According to a preferred embodiment, a requester may send a query to the sender. If the sender does not support the information exchange interface, then it cannot generate a valid response. Therefore, the requester will know that it cannot apply the mechanism to the sender. Based on at least one implementation, a mechanism may be required to determine if the sender of the first request supports the information exchange interface. If so, then the receiver could query the sender for additional information. As such, the sender is queried and based on the response, it is determined as to whether the sender supports the information exchange interface.

However, according to an alternate implementation, the device may maintain a list of IP, for example, that supports the proposed mechanism. Therefore, before receiving the content from the address in the list, the device may try to query the related information from the device in the source side. Then, the device in the source side may return information containing the required information. With the information from the source side, the security device in the destination can perform advanced policies. One advantage of maintaining a list of IP is to simplify the error handling as such, the requester may not send unnecessary traffic back to the sender.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for transparent asynchronous network flow information exchange. According to at least one implementation, the present embodiment may provide an interface on a security device to provide necessary flow information to the remote devices and/or applications to perform security policy enforcement. Additionally, a transparent mechanism may be used to send the flow information back to the requester by leveraging the original connection that sent the first request. Therefore, the devices and/or applications in the cloud may asynchronously query the on-premise security devices to gather necessary security information per the flow, request, or session.

The integration may happen in applications, frameworks, and infrastructures. An example of an integration sample may be as follows:

```
var express = require('express')
var ISS = require('ISS')
var app = express( )
app.get('/', function (req, res) {
  var flow_sec_info = ISS.get(req)
  if (flow_sec_info.virus_infected == false)
  res.send('Hello World!')
})
var server = app.listen(3000, function ( ) {
  var host = server.address( ).address
  var port = server.address( ).port
  console.log('Example app listening at , host, port)
})
```

Referring to FIG. 1, an exemplary networked computer environment 100 in accordance with one embodiment is depicted. The networked computer environment 100 may include a computer 102, a processor 104, a security device 118A, and a data storage device 106 that is enabled to run a software program 108 and a Transparent Asynchronous Network Flow Information Exchange Program 116A. The networked computer environment 100 may also include a server 114 that has a security device 118B and is enabled to run a Transparent Asynchronous Network Flow Information Exchange Program 116B that may interact with a database 112 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Transparent Asynchronous Network Flow Information Exchange Program 116B running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Transparent Asynchronous Network Flow Information Exchange Program 116A, 116B may interact with a database 112 that may be embedded in various storage devices, such as, but not limited to a computer 102, a networked server 114, or a cloud storage service.

As previously described, the client computer 102 may access the Transparent Asynchronous Network Flow Information Exchange Program 116B, running on server computer 114 via the communications network 110. For example the Transparent Asynchronous Network Flow Information Exchange Program 116A, 116B running on a client computer 102 and server computer 114 may allow the security device 118A in the source (i.e., client computer 102) to share required information with the security device 118B on the destination side. (i.e., server computer 114). Therefore, the security device 118B in the destination (i.e., server computer 114) may perform actions with greater granularity. Furthermore, the present embodiment may provide an asynchronous, proactive mechanism to query the additional flow information from the network flow receiver 114 (i.e. any device that can receive network packets, such as an IPS, Gateway, Router, PC, or server) to the security device 118A and an interface on the security device 118A to handle the query sent from the network flow receiver 114 to acquire additional flow information. As such, according to at least one implementation, the present embodiment may allow all network devices on the path from security device 118A to server computer 114 to send a request to the security device 118A on the source side, to query the flow information and apply advanced policies. The security device 118A may then apply different security policy. Additionally, if the request is sent by an application (such as a web server), then the behavior may adjust accordingly. The Transparent Asynchronous Network Flow Information Exchange method is explained in more detail below with respect to FIGS. 2-3.

Figure 2:
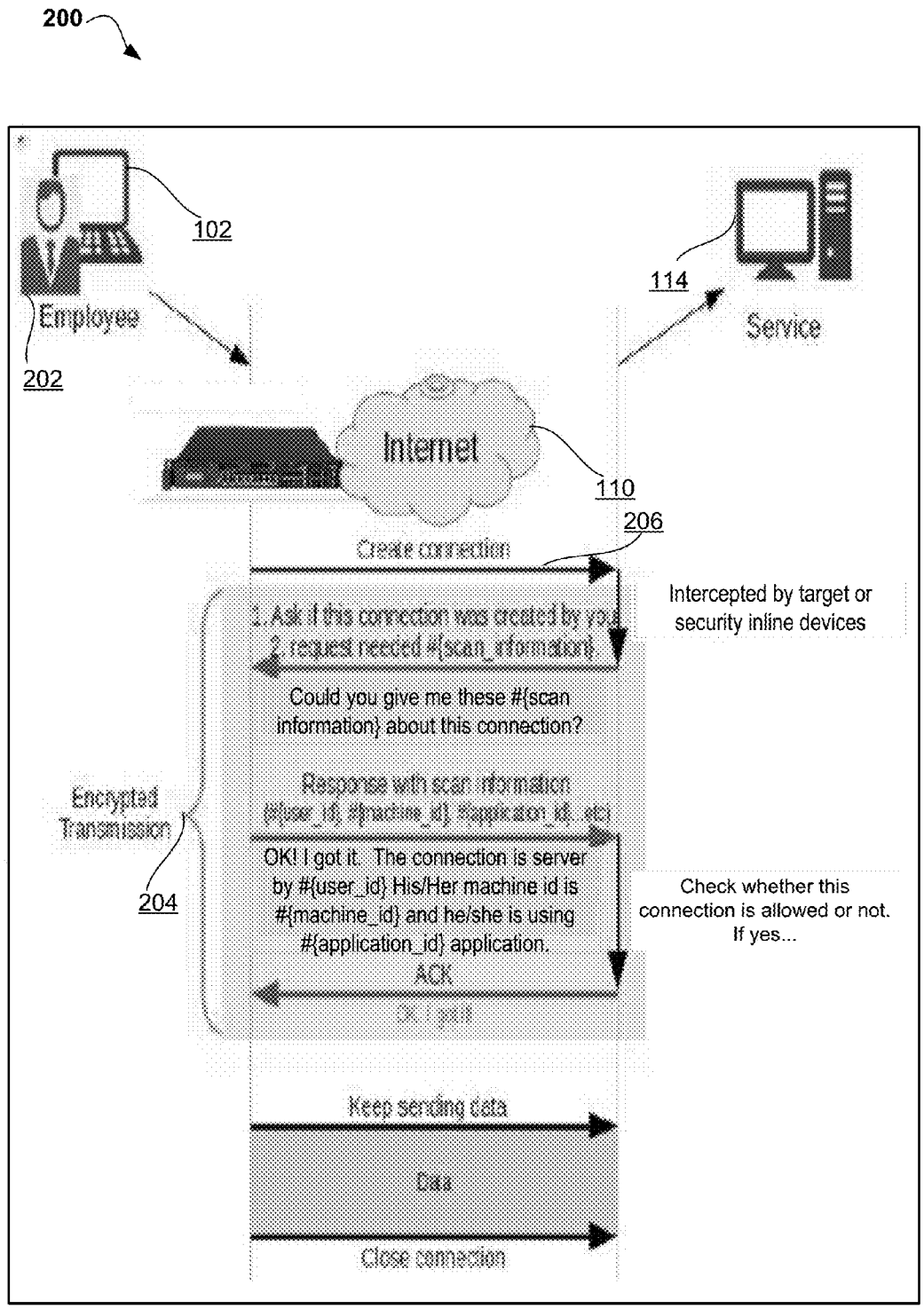
FIG. 2 illustrates an exemplary system architecture according to at least one embodiment.

Referring now to FIG. 2, an exemplary system architecture 200 in accordance with one embodiment is depicted. According to at least one implementation, the present embodiment may be utilized to enhance security controls between a company and a company cloud service. As such, FIG. 2 illustrates a flow of an employee 202 using a client computer 102 accessing a company cloud service 114. Each side 102, 114 will have one network protection, such as an XGS network interface installed 118A, 118B (FIG. 1). As such, if one employee 202 wants to access the company cloud service 114, the network packets must be passed through two XGSs 118A, 118B (FIG. 1). Then, when the connection is created 206 between the two XGSs 118A, 118B (FIG. 1), the XGSs 118A, 118B (FIG. 1) will first use this connection 206 to share some information with each other. For example, the destination side 114 XGS 118B (FIG. 1) will send what scans it will do and the source side 102 XGS 118A (FIG. 1) will send the user information related to this connection, such as user_id, machine_id, application_id. Then, the destination side 114 XGS 118B (FIG. 1) will know who creates this connection 206 and it can check whether the user 202 is allowed to access this service. After the check is finished, the data will be sent as an encrypted transmission 204 if the user 202 is allowed. Furthermore, the present embodiment may restrict access to the service 114 for a specific user 202. It should be appreciated that FIG. 2 provides only an illustration of one implementation and does not imply any limitations with regard to the environments in which different embodiments may be implemented. Many modifications to the depicted environments may be made based on design and implementation requirements. For example, the information sharing can happen anytime. However, with respect to FIG. 2, the information sharing is depicted as happening in the beginning of the connection and therefore is referred to as asynchronous. Furthermore, the information sharing will not block the data transmission and the network flow receiver 114 may request the information whenever it wants to so long as the connection 206 is alive.

Figure 3:
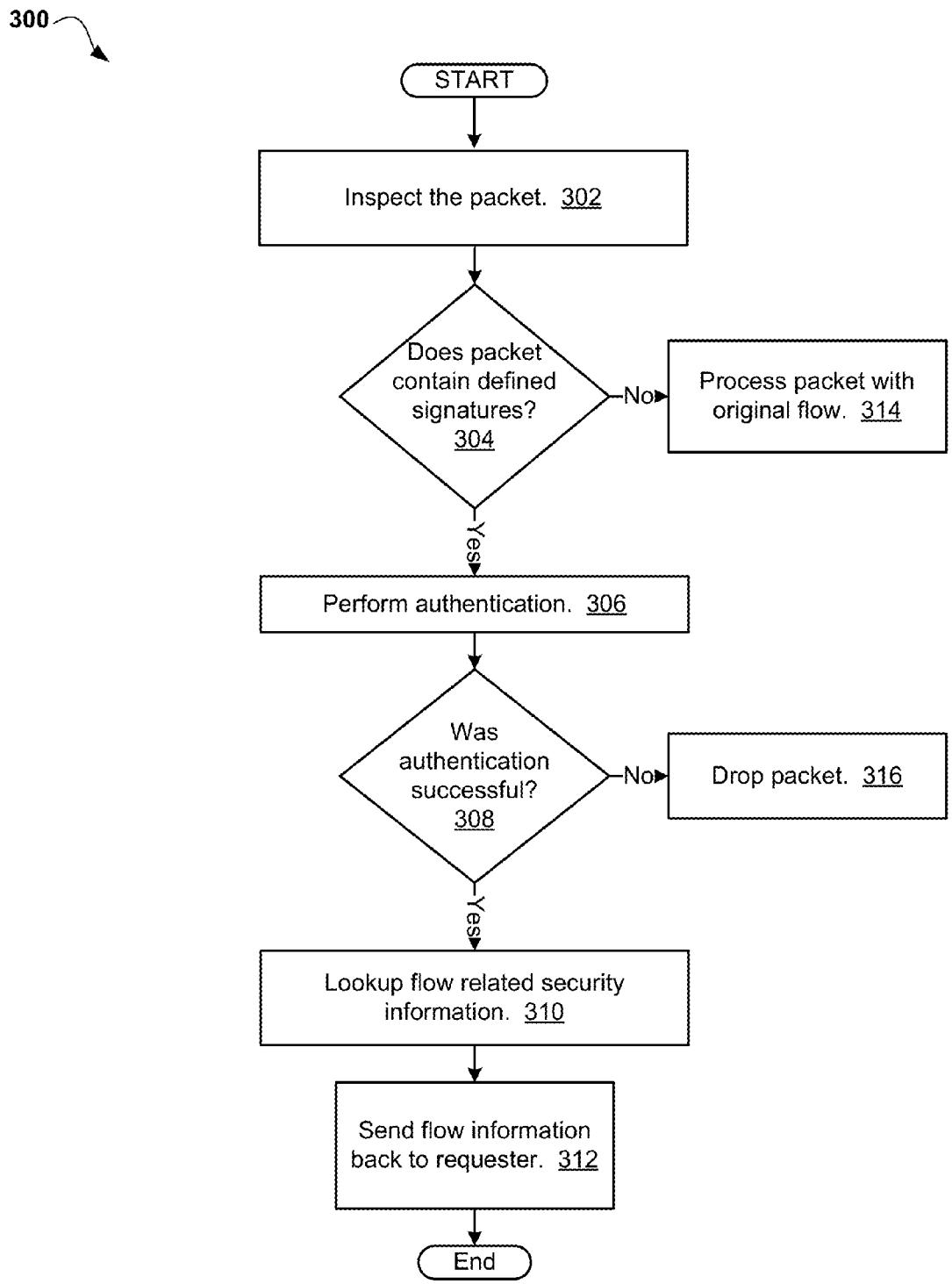
FIG. 3 is an operational flowchart illustrating the steps carried out by a program that that provides a transparent asynchronous network flow information exchange according to at least one embodiment.

Referring now to FIG. 3, an operational flowchart 300 illustrating the steps carried out by a program that provides a transparent asynchronous network flow information exchange in accordance with one embodiment is depicted. As previously described, the present embodiment may retrieve necessary flow information through an asynchronous request to perform advanced security policy enforcement in the cloud.

With respect to FIG. 3 at 302, the network packet is inspected. According to at least one implementation, the network packet may be inspected in response to a query request by a requester. For example, an interface (i.e., program/software or protocol) may allow the requester to query security information attached to a connection or endpoint from trusted security devices, such as an IPS (IPS as being used for example purposes only). Additionally, the remote applications (such as a web service, or gateway, or anything out of the enterprise) do not need to establish a new connection to communicate with the interface described herein.

Then at 304, it is determined whether the network packet contains defined signatures. If at 304 it is determined that the network packet does not contain any defined signatures, then the method will continue to step 314 to process the network packet according to the original flow. However, if at 304 it is determined that the network packet does contain defined signatures, then the method will continue to step 306 to perform authentication.

Then at 308, it is determined whether the authentication was successful. If at 308 it is determined that the authentication was not successful, then the method will continue to step 316 to drop the network packet. However, if at 308 it is determined that the authentication was successful, then the method will continue to step 310 to lookup the flow related security information. Next at 312, the flow information is sent back to the requester.

It may be appreciated that FIGS. 2-3 provide only an illustration of one implementation and do not imply any limitations with regard to how different embodiments may be implemented. Many modifications to the depicted environments may be made based on design and implementation requirements. As previously mentioned, the present embodiment may be composed of two parts:

1. An asynchronous, proactive mechanism to query the additional flow information from the network flow receiver 114 (FIG. 1) to the security device 118A, 118B (FIG. 1); and 2. An interface on the security device 118A, 118B (FIG. 1) to handle the query sent from the network flow receiver 114 (FIG. 1) to acquire additional flow information.

As such, based on the above described implementation, the security device 118A (FIG. 1) in the source 102 (FIG. 1) can share required information to the device 118B (FIG. 1) in the destination side 114 (FIG. 1), so that the security device in the destination 114 (FIG. 1) can perform actions with greater granularity. For example, with respect to the IBM® next generation Intrusion Prevention System, XGS, the information used for authentication purposes may be a user ID, a machine ID, an application type, or the scan information of the connection. As such, with these attributes, the security device 118B (FIG. 1) in the destination side 114 (FIG. 1) may apply advanced policies according to the given information. For example, the security device in the destination side may allow traffic with a specific application ID to some corresponding (virtual) machines, or deny connections with a user that does not have correct permissions to specific machines.

According to at least one implementation, the device may maintain a list of IP that supports the proposed mechanism. Then, before receiving the content from the address in the list, the device 118B (FIG. 1) in the destination side 114 (FIG. 1) will try to query the related information from the device 118A (FIG. 1) in the source side 102 (FIG. 1). The device in the source side will return information containing the required information. With the information from the source side 102 (FIG. 1), the security device in the destination 114 (FIG. 1) can perform advanced policies.

The following are example implementations of the present embodiment (IBM® Bluemix™ is used for example purposes only):

Example 1 is the scenario that enterprise wants to access their applications/services running in IBM® Bluemix™ while each side has a security device installed. (e.g. IPS). The following are the steps involved to exchange the network flow information:

a. Enterprise, running on server computer 114 (FIG. 1) (with Security Device 118 B (FIG. 1) installed) sends a request to Bluemix™, running on client computer 102 (FIG. 1) (with Security Device 118 A (FIG. 1) installed), and the request will be processed by Security Device 118 B (FIG. 1) first then forwards the request to Bluemix™ (with Security Device 118 A (FIG. 1) installed).

b. Security Device 118 A (FIG. 1) receives the request sent from Enterprise and it wants to gather more information related to the request, hence, it initiates a query to Security Device 118 B (FIG. 1) to gather more information.

c. Security Device 118 B (FIG. 1) receives the query then looks up the network flow information and sends the result back to Security Device 118 A (FIG. 1).

d. Security Device 118 A (FIG. 1) verifies the response and checks if the request with the additional flow information complies with the security policy and then forwards the request to applications/services in Bluemix™.

Example 2 is the scenario that the Bluemix™ application, running on client computer 102 (FIG. 1) (with Security Device 118 A (FIG. 1) installed), wants to access a DB service running in Enterprise, running on server computer 114 (FIG. 1), (each side has a security device installed, such as. IPS). The following are the steps involved in this scenario:

a. An application running in Bluemix™ wants to access a database located inside Enterprise. The request to the local database first goes through Security Device 118 A (FIG. 1) then it is forwarded to the Enterprise.

b. Security Device 118 B (FIG. 1) sees the request and it wants to gather more information related to it, so it send a query to Security Device 118 A (FIG. 1) to acquire more information.

c. Security Device 118 A (FIG. 1) received the query then replied with the corresponding flow information. For example, Security Device 118 A (FIG. 1) knows who is the user using the application to access the local database.

d. After receiving the additional flow information from Security Device 118 A (FIG. 1), Security Device 118 B (FIG. 1) forwards the request to the database server if the all the information bound with the request complies with the security policy.

Example 3 is the scenario that only one side of the data center has the security device installed. (i.e., client computer 102 (FIG. 1) with Security Device 118 A (FIG. 1) installed). However, the applications/services running in other location can still manually query the Security Device 118 A (FIG. 1) to validate the request sent from Bluemix™ applications. This mechanism is not transparent to the applications/services running in other location but it removes the dependency to the security devices. The following are the steps in this scenario:

a. Application running in Bluemix™ wants to access a database service running on Internet.

b. The database service received the request. However, it wants to validate the sender before actually query the database. So it queries Security Device 118 A (FIG. 1) to get more information related to the request.

c. Security Device 118 A (FIG. 1) receives the query then reply with the corresponding flow information.

d. The database service verifies the response then queries the database if the information bind with the request complies with the security policy.

The present embodiment pushes the security policy enforcement, such as IPS, across the data center in Enterprise to the Cloud and as such, may provide greater granularity in policy designs to make them adaptive to different use cases in applications. To provide security policy with greater granularity to applications in the cloud, the present embodiment provides an interface to allow applications and infrastructure devices (such as a router in the cloud to query necessary security information attached to the given network flow from the security services located in enterprise, such as IPS.

Significantly, the interface allows the requester to query security information attached to connection/endpoint from trusted security devices, such as an IPS (IPS as being used for example purposes only). Additionally, the remote applications (such as a web service, or gateway, or anything out of the enterprise) do not need to establish a new connection to communicate with the interface described herein. Significantly, the interface utilizes a network packet filtering mechanism to filter the special request sent from the cloud. Therefore, the present embodiment may leverage the original connection to bypass firewall or other network devices on the route and the query is asynchronous. The application can query the interface when needed, such as right before the application accesses the sensitive database. Furthermore, the security information provided by the interface includes end-point status, end-point historical data, the security score, etc. and the application may collect necessary security information actively.

However, in another implementation, a requestor may use an out-of-band channel to send the query to sender. For example, a requestor can establish a new connection to the security device to query the additional flow information. As such, the query may need to contain the packet/flow information for the security device to look up the additional flow information.

According to at least one implementation, the present embodiment does not need to set up a secure tunnel first. Rather, the present embodiment transparently inspects the network packet's flow directly to send further information in the same connection and it is asynchronous since the further information may be transmitted at any time, without needing to change the infrastructure on each side.

Additionally, the web-hosted application may be allowed to query necessary security information based on the application logic. For example, the web-hosted application could obtain security information for high-security concern traffic and save unnecessary tunnel overhead for low-security concern traffic.

Figure 4:
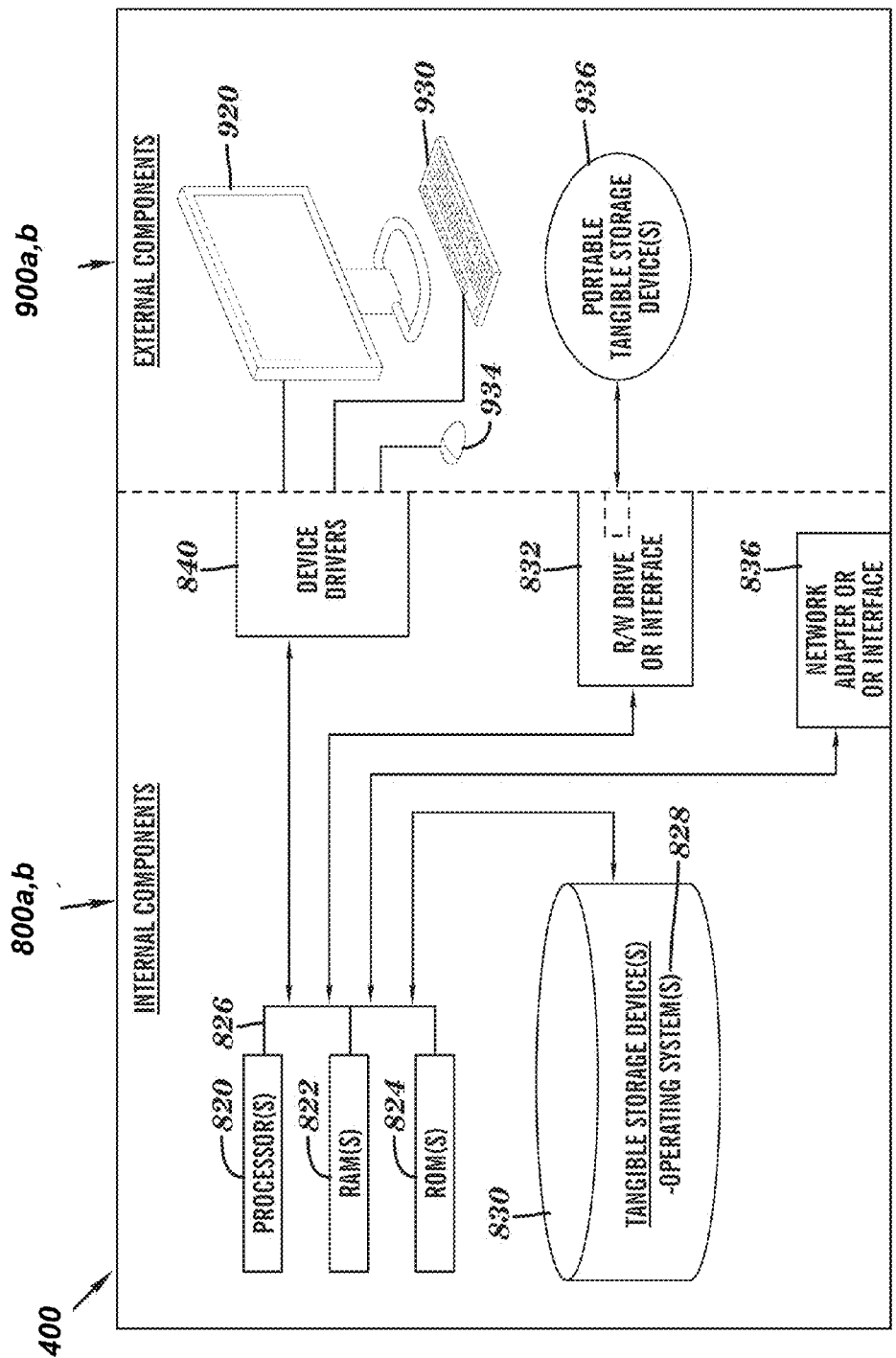
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Transparent Asynchronous Network Flow Information Exchange Program 116A (FIG. 1) in client computer 102 (FIG. 1) and the Transparent Asynchronous Network Flow Information Exchange Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Transparent Asynchronous Network Flow Information Exchange Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Transparent Asynchronous Network Flow Information Exchange Program 116A (FIG. 1) in client computer 102 (FIG. 1) and the Transparent Asynchronous Network Flow Information Exchange Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Transparent Asynchronous Network Flow Information Exchange Program 116A (FIG. 1) in client computer 102 (FIG. 1) and the Transparent Asynchronous Network Flow Information Exchange Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
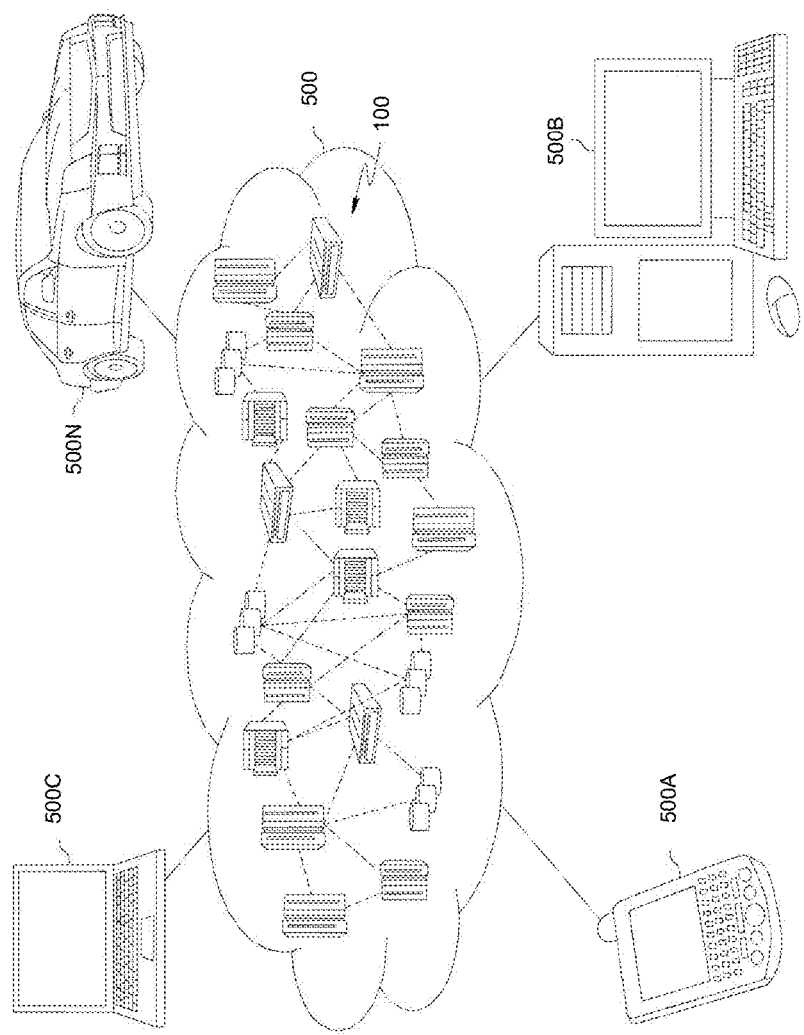
FIG. 5 is a block diagram of an illustrative cloud computing environment including the computer system depicted in FIG. 1, according to at least one embodiment.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
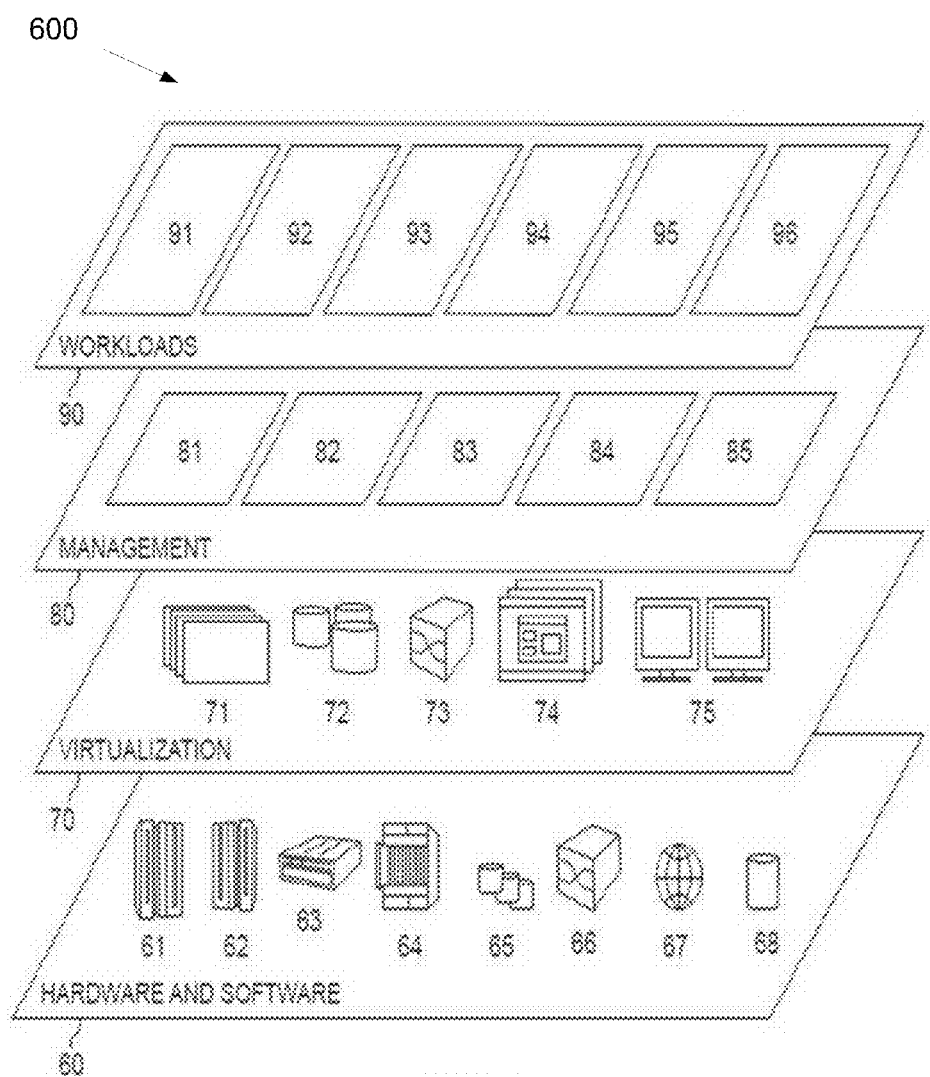
FIG. 6 is a block diagram of functional layers of the illustrative cloud computing environment of FIG. 5, according to at least one embodiment.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Transparent Asynchronous Network Flow Information Exchange 96. A Transparent Asynchronous Network Flow Information Exchange Program 116A, 116B (FIG. 1) may provide an asynchronous, proactive mechanism to query the additional flow information from the network flow receiver to the security device and an interface on the security device to handle the query sent from the network flow receiver to acquire additional flow information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for providing a transparent asynchronous network flow exchange, the method comprising:
    receiving, by a processor, a query request from a requester, wherein the received query request is associated with a network packet;
    determining if the network packet contains a plurality of defined signatures;
    in response to determining that the network packet contains a plurality of defined signatures, authenticating a plurality of information associated with the network packet;
    identifying a plurality of flow related security information associated with the network packet based on the authentication of the plurality of information, wherein identifying the plurality of flow related security information includes identifying a user ID, a machine ID, an application type, and a scan information of a connection; and
    sending the determined plurality of flow related security information to the requester to determine if the identified plurality of flow related security information matches a maintained list of security information, wherein a security device in a destination side or a request receiver can apply a plurality of advanced policies according to the plurality of flow related security information, and wherein the request receiver comprises at least one of a plurality of applications, a plurality of security devices, and a plurality of infrastructure devices.

2. The method of claim 1, wherein the query request is sent from a network flow receiver to a security device.

3. The method of claim 2, wherein the security device has an interface to handle the query sent from the network flow receiver to acquire the plurality of flow related security information.

4. The method of claim 2, wherein the security device can maintain a list of IP that supports a proposed mechanism.

5. The method of claim 1, wherein the requester is an application or an infrastructure device.

6. The method of claim 3, wherein the interface allows the requester to query the plurality of flow related security information, wherein the plurality of flow related security information is attached to a connection or an endpoint from a trusted security device.

7. A computer system for providing a transparent asynchronous network flow exchange, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    receiving a query request from a requester, wherein the received query request is associated with a network packet;
    determining if the network packet contains a plurality of defined signatures;
    in response to determining that the network packet contains a plurality of defined signatures, authenticating a plurality of information associated with the network packet;
    identifying a plurality of flow related security information associated with the network packet based on the authentication of the plurality of information, wherein identifying the plurality of flow related security information includes identifying a user ID, a machine ID, an application type, and a scan information of a connection; and
    sending the determined plurality of flow related security information to the requester to determine if the identified plurality of flow related security information matches a maintained list of security information, wherein a security device in a destination side or a request receiver can apply a plurality of advanced policies according to the plurality of flow related security information, and wherein the request receiver comprises at least one of a plurality of applications, a plurality of security devices, and a plurality of infrastructure devices.

8. The computer system of claim 7, wherein the query request is sent from a network flow receiver to a security device.

9. The computer system of claim 8, wherein the security device has an interface to handle the query sent from the network flow receiver to acquire the plurality of flow related security information.

10. The computer system of claim 8, wherein the security device can maintain a list of IP that supports a proposed mechanism.

11. The computer system of claim 7, wherein the requester is an application or an infrastructure device.

12. The computer system of claim 9, wherein the interface allows the requester to query the plurality of flow related security information, wherein the plurality of flow related security information is attached to a connection or an endpoint from a trusted security device.

13. A computer program product for providing a transparent asynchronous network flow exchange, the computer program product comprising:

one or more computer-readable storage devices and program instructions stored on at least one of the one or more tangible storage devices, the program instructions executable by a processor, the program instructions comprising:

program instructions to receive a query request from a requester, wherein the received query request is associated with a network packet;

program instructions to determine if the network packet contains a plurality of defined signatures;

in response to determining that the network packet contains a plurality of defined signatures, program instructions to authenticate a plurality of information associated with the network packet;

program instructions to identify a plurality of flow related security information associated with the network packet based on the authentication of the plurality of information, wherein identifying the plurality of flow related security information includes identifying a user ID, a machine ID, an application type, and a scan information of a connection; and program instructions to send the determined plurality of flow related security information to the requester to determine if the identified plurality of flow related security information matches a maintained list of security information, wherein a security device in a destination side or a request receiver can apply a plurality of advanced policies according to the plurality of flow related security information, and wherein the request receiver comprises at least one of a plurality of applications, a plurality of security devices, and a plurality of infrastructure devices.

14. The computer program product of claim 13, wherein the query request is sent from a network flow receiver to a security device.

15. The computer program product of claim 14, wherein the security device has an interface to handle the query sent from the network flow receiver to acquire the plurality of flow related security information.

16. The computer program product of claim 14, wherein the security device can maintain a list of IP that supports a proposed mechanism.

* * * * *